(12) United States Patent
Kretz et al.

(10) Patent No.: US 7,396,380 B2
(45) Date of Patent: Jul. 8, 2008

(54) METHOD FOR PRODUCING METAL FOAM BODIES

(75) Inventors: Richard Kretz, Braunau (AT); Karin Renger, Braunau (AT); Gottfried Rettenbacher, Handenburg (AT); Anton Hinterberger, Strasswalchen (AT)

(73) Assignee: Alulight International GmbH, Ranshofen (AT)

( * ) Notice: Subject to any disclaimer, the term of this patent is extended or adjusted under 35 U.S.C. 154(b) by 0 days.

(21) Appl. No.: 10/542,325

(22) PCT Filed: Dec. 22, 2003

(86) PCT No.: PCT/AT03/00380

§ 371 (c)(1),
(2), (4) Date: Jan. 9, 2006

(87) PCT Pub. No.: WO2004/063406

PCT Pub. Date: Jul. 29, 2004

(65) Prior Publication Data

US 2006/0150771 A1  Jul. 13, 2006

(30) Foreign Application Priority Data

Jan. 13, 2003  (AT) ................... A 33/2003

(51) Int. Cl.
*C22B 7/00* (2006.01)
(52) U.S. Cl. ................... 75/415; 428/593
(58) Field of Classification Search ........... 75/415; 428/593
See application file for complete search history.

(56) References Cited

U.S. PATENT DOCUMENTS

| | | | |
|---|---|---|---|
| 3,692,513 A | | 9/1972 | Hall |
| 4,713,277 A | * | 12/1987 | Akiyama et al. ............. 428/131 |
| 5,409,580 A | * | 4/1995 | Gesing et al. ............... 205/363 |
| 5,622,542 A | * | 4/1997 | Thomas et al. ............... 75/415 |
| 5,632,319 A | * | 5/1997 | Yang et al. .................. 164/79 |
| 5,981,919 A | * | 11/1999 | Masten, Jr. .................. 219/502 |
| 2002/0121157 A1 | * | 9/2002 | Knott et al. ................. 75/392 |

FOREIGN PATENT DOCUMENTS

| | | |
|---|---|---|
| AT | 405 946 B | 12/1999 |
| JP | 55-138039 | * 10/1980 |
| JP | 01-127631 | * 5/1989 |
| JP | 1-127631 A | 5/1989 |

OTHER PUBLICATIONS

English translation of Japanese patent document 01-127631.*
English abstract of JP 55-138039.*
Malki et al., Kinetic study of thermal decomposition of calcium carbonate in the presence of K2CO3 and BaCO3, Journal of Materials Science Letters 4 (1985) 532-536.*
ASM Handbook, vol. 15, Casting, ASM International, 1988, pp. 11, 275-277, 280-281, 744-745 and 457-461.*
ASM Handbook, vol. 2, Properties and Selection: Nonferrous Alloys and Special-Purpose Materials, ASM International, 1990, pp. 1205-1206.*
English translation of Japanese patent document 55-138039.*
Friedrich, Horst E. and Mordike, Barry L. Magnesium Technology: Metallurgy, Design Data, Applications. Springer-Verlag Berlin Heidelberg, Germany. 2006. pp. 234, 258-61.*

* cited by examiner

*Primary Examiner*—Roy King
*Assistant Examiner*—Tima M McGuthry-Banks
(74) *Attorney, Agent, or Firm*—David S. Safran

(57) ABSTRACT

The invention relates to a method for producing a metal foam body, according to which a molten material containing gas is prepared and said molten material is left to solidify, thus forming a metal foam body. The aim of the invention is to produce high-quality metal foam bodies with a desired shape, without requiring complex equipment and whilst reducing the safety risk for the operating personnel. To achieve this, the material used is fused under atmospheric pressure and gas is simultaneously and/or subsequently introduced into the molten metal. The latter is then poured into a mold and is left to solidify, whereby the ambient pressure is reduced at least temporarily.

10 Claims, No Drawings

METHOD FOR PRODUCING METAL FOAM BODIES

The invention pertains to a process for manufacturing a metal foam body, whereby a gas-containing fused metal is produced and the fused metal is allowed to coagulate under formation of a metal foam body.

Porous objects are referred to as metal foam bodies, in which gas-filled pores are embedded in a fixed matrix, which is made of metal or at least has a prominently large share by weight of metal. The embedded pores are generally shaped spherical and/or ellipsoidal and are separated from one another by walls of matrix material. Depending on the production, metal foam bodies can be designed in the region of the outer surface primarily compact or pore-free. In such a case, in a metal foam body a porous inner part is surrounded at least partly by a dense outer layer or a dense skin.

On account of process-technically achievable high porosity and a low density, properties which are advantageous for many applications, e.g. good sound absorption, relatively low heat conductivity as compared to dense matrix material or high deformation capacity in case of impact, metal foam bodies can have a wide spectrum of possible applications as light-weight functional components.

In order to completely exploit this potential application spectrum, it is desirable from the economic and technological point of view to be able to manufacture moulds of metal foam having high quality, as well as which could be manufactured in a simple and cost-effective manner. The main quality criteria are mould-density, number, shape, size of the pores and distribution of these in the mould, as well as in case of design of the metal foam body with a dense or pore-free outer layer a surface quality of the outer surface.

As a result of the well known high application potential of metal foam bodies, already significant efforts have been undertaken to present a process for its manufacture, which would fulfil the mentioned desired expectations.

According to the state-of-the-art technology, presently several categories of processes are in use.

Firstly, it has already been suggested to manufacture cellular metal bodies having pores by coating objects, e.g. by means of electro-chemical process. More precisely, with such a processes compound bodies are produced, which consist of dense substrate parts, which serve as coating base, and porous metal parts separated from these substrate portions. The disadvantage of this process is that, with coating technologies basically only small layer thicknesses can be achieved and hence an attainable volume of separated porous metal is limited. Also, in case of these compound bodies there could be adhesion problems of the type that during usage the separated metal foam parts get easily peeled off from the substrate portions.

Secondly, powder-metallurgical processes have been suggested, e.g. in the U.S. Pat. No. 3,087,807 or DE 4 018 360 C1. In processes of this type, a metal powder is mixed with a blowing agent powder and the mixed powder material is made compact through pressing or deformation. Thereafter the compact material is heated till the point of splitting gas from the blowing agent which could thus form pores in the previously compacted material. With the help of such powder-metallurgical processes, metal foam bodies of high quality can be produced. However, these processes are complex with respect to the material used and the required devices, because a manufacture and the use of at least two powder components is necessary. The individual powder components also have to be internally mixed before heating and the powder grains must be welded with one another, e.g. by heat-isostatic pressing, in order to achieve pores with homogeneous distribution in the metal foam body.

Thirdly, fused-metal processes are known. In these processes, a foamable fused metal is produced and then a gas is introduced into the fused metal, whereby fluid metal foam is generated, which collects on the fused surface. The metal foam present on the fused surface can, as published in EP 666 784 B, on account of its flow-capability be processed by careful pressing to moulds, retaining the porous structure. The disadvantage of such a fused-metal process is, that a fused metal cannot be foamed in its pure condition. For the purpose of achieving foamability, before conducting the foaming the molten material must be displaced with a viscosity-increasing agent, e.g. an inert gas (GB 1, 287, 994), or with ceramic particles (EP 0 666 784 B). As already mentioned, the metal foam collected on the fused surface is flow-capable. This is favourable for a mould processing of the metal, foam; however, as a result of lacking stabilization of the metal walls, this could lead to particle collapse of the foamed metal foam and hence to an uncontrollable formation of dense zones in the interior of an object thus produced.

With respect to fuse-metallurgical processes, also processes have been suggested which could be conducted without viscosity-enhancing additives. Thus it is known that in a metal fuse under high pressure and high temperatures hydrogen can be released, which on account of a solubility jump during coagulation of the fuse could get released under formation of bubbles. The bubbles can be locked in during coagulation of the fuse, whereby a porous metal object gets formed. With the help of such processes dense metallic starting materials can be immediately converted into bodies having pores, for which however significant complicated apparatus machinery is necessary. Particularly for introducing hydrogen into a melt autoclaves are required which can withstand high pressure and temperatures. Furthermore, use of hydrogen at high pressures and temperatures of at least a few hundred degrees bring about a significant safety risk for the operating personnel. Moreover, a portion of the formed bubbles or the released gas could exit during coagulation of a fuse, so that locking of the released gas does not take place in the melt and as a result the porosity of the object produced with this method is low.

This is where the invention comes in and has the objective of presenting a generic process, with which metal foam bodies of high quality with low apparatus complexity and reduced safety risk of the operating personnel can be manufactured.

This objective is achieved, in that in a process of the type mentioned above, introduced material under atmospheric pressure is melted and thereby and/or thereafter gas is introduced into the fluid, whereby the fluid metal is brought into a shape and is allowed to coagulate at reduced surrounding pressure at least for a period of time.

The advantages of the invention lie therein, that metal foam bodies of high porosity can be produced with less complexity of apparatuses and in a surprisingly simple manner. It has been seen that on fusing an introduced material under atmospheric pressure in an open melting crucible without over-pressure devices and a simultaneous and/or subsequent introduction of gas into the fluid phase of the introduced material can result in a sufficient gas load of the melt, in order to effect the formation of a metal foam body of low density during coagulation of the same. This effect can be utilised as pet the invention for producing a metal foam body of desired shape in a beneficial manner, if the fluid metal is first brought into a shape and then allowed to coagulate under at least time-wise reduced surrounding pressure. Due to a hardening the melt at reduced surrounding pressure one gets a formation of several gas bubbles in the melt, which however on account of the setting and continuing coagulation of the melt get locked in it, as a result of which the metal foam bodies as per the invention have a low density.

Furthermore, a process as per the invention has the advantage of a higher safety for the operating personnel, as use of gases at high pressures and high temperatures can be avoided till the conducting of a process as per the invention.

It has proved to be particularly advantageous in the case of the process as per the invention, if at least parts of the introduced material is converted into at least one compound before fusing, which would give out in the region of and/or over the fusing interval of the same at least one gas which is soluble in fluid metal. As through this measure the pore-forming components, a gas, can already be made available before fusing of an introduced material in the form of a gas-emitting compound, one can totally do away with device agents for introducing the gas into a fuse. It is also advantageous that a conversion can take place at temperatures which are significantly below the melting temperature of the metal. In this way, a gas can be introduced in bound form at low temperatures and hence in effect also save energy. In order to subsequently introduce a gas into a fuse, only a brief heating of pre-treated introduction material has to be carried out up to a disintegration temperature of a gas-emitting or gas-splitting compound, whereby the dwell time in a furnace can be reduced and the material throughput can be increased.

In a process as per the invention, a conversion of at least parts of the introduced material can take place before fusing in at least one compound, which in the region of and/or over the fusing interval of the same emits at least one gas which is soluble in fluid metal; in a preferred extension this takes place through contact with a gas or gas mixtures. It is advantageous that the extent of a conversion of the introduced material in the zones near the surface and hence a quantity of the gas(es) introduced during fusing can be controlled by means of the fed gas charge and the treatment duration can be precisely controlled.

In a process as per the invention a conversion of at least parts of the introduced material into at least one compound which would emit gas soluble in the fluid metal in the region of and/or over the melting interval of the same can be conducted, in that a contact takes place with an aerosol. This is particularly advantageous if the reaction of an introduced material with a fluid as reaction partner would take place with great heat release. With the help of an aerosol, on the one hand, a reaction partner with a carrier gas can be thinned and fed in a fluid state and a high local heating of an introduced material during conversion can be avoided. On the other hand, the carrier gas effects a heat discharge or a cooling of the treated material.

In a process as per the invention, with respect to a conversion of at least parts of the introduced material before fusing into at least one compound which emits a gas soluble in the fluid metal in the region of and/or over the melting interval of the same, it can be further foreseen that the compound emits gas(es) at a temperature of max. 250° C., preferably max. 150° C., above the melting or coagulating temperature of the metal. This has the advantage that an overheating of the metal for the purpose of emitting gas(es) from the compound and the energy consumption involved in the process for manufacturing a metal foam body can be kept as low as possible.

Moulds made of metal foam of high quality can be produced in a particularly simple manner, if the introduced material is formed from a light metal, especially magnesium or a magnesium alloy, because these metals have very good dissolving properties for gases. Hence, with the introduction of light metals in a process as per the invention one can achieve a high porosity of metal foam bodies.

Maximum porosity of the produced metal foam bodies can be achieved with simple devices, if in a process as per the invention the coagulation of the fluid metal takes place at a surrounding pressure in the region of 0.03 bar to 0.2 bar. Surrounding pressures in this selected range are process-technically simple and can be precisely set and can be produced with the simplest devices, e.g. with so called water jet pumps.

In a further advantageous variant of the process as per the invention, before introducing the fluid metal the mould is pre-heated. Through this measure one can achieve that a metal foam body with an at least largely dense outer layer gets formed, whereby simultaneously cracks on or in the dense outer layer or surface layer, which could appear in case of a shock, can be kept minimum.

If in a process as per the invention a heat-insulated mould is used, then the density of the produced metal foam bodies can be significantly reduced. The reason for this effect is presently not clear. According to expert opinion a possibly effective discharge of the released coagulation heat of the fused mass and subsequently rapid cooling should be the objective in order to retain a gas introduced into a fuse on coagulation of the same, or prevent an exit from the same.

Contrary to this opinion it has however been found now that in a process as per the invention use of a heat-insulated mould, whereby a heat discharge and hence a cooling gets delayed, leads to metal foam bodies with significantly lower density.

The invention is explained below on the basis of examples.

EXAMPLE 1

Blocks of alloy AZ 91 were produced, which is a magnesium alloy with approx. 9 percent by weight of aluminium and approx. 1 percent of by weight of zinc and the rest magnesium. Thereafter, the produced material was stored for several days in open air and thereby subjected to moist air and rain.

After a storage the blocks were melted in melting crucibles under atmospheric pressure, whereby an atmosphere consisted of 1 vol.-% $SF_6$ and 99 vol.-% argon. A fused metal was heated to 685° C.; then approx. 70 gms of this fused metal was filled into a crucible pre-heated to a temperature of 300° C. Subsequently the filled crucible was brought into an under-pressure chamber, the chamber was closed and immediately thereafter an under-pressure of 80 millibar was generated in the chamber. This under-pressure was retained for seven minutes, after which the chamber was ventilated and opened and the crucible was removed.

In the crucible a porous metal foam body having pores in its interior got formed with a density of approx. 0.95 gm/cm$^3$. An external surface of the body was mainly dense and formed without cracks. On cross-sectional observation of the foam body after cutting up the same, it was seen that the formed pores had a diameter of approx. 1 to 4 mm. and were uniformly distributed over the cross-sectional area. A dense outer layer or skin was approx. 1 mm. thick.

EXAMPLE 2

In another experiment one proceeded analogous to example 1, whereby a heat-insulated crucible was used. One obtained a metal foam body with a mainly dense and crackfree surface. The pores structure corresponded to what was described in example 1. Compared to a metal foam body produced in a crucible which was not heat-insulated, as described in example 1, it could be determined here that the density of the metal foam body was significantly lower at approx. 0.75 gm/cm$^3$.

EXAMPLE 3

The experiments mentioned in example 1 and 2 were repeated with commercial magnesium scrap parts of the type AZ 91. One achieved analogous results to example 1 or example 2. Consequently, with the process as per the invention there is also a possibility of converting recycling material into high-value functional components in a simple manner.

In further experiments with recycling material one could obtain particularly advantageous results with respect to low foam body density and pore formation with die-casting scrap of magnesium alloys as introducing material. Thereby, experiments conducted process-technically analogous to example 1 and example 2, yielded magnesium foam bodies with densities of 0.85 gms/cm$^3$ and 0.65 gms/cm$^3$. This is on account of the fact that during die-casting process, gas is introduced into the cast metal and hence die-cast parts are always porous. Now, if die-cast scrap is used in a process as per the invention, then gas can be introduced not only through disintegration of the compounds present on the surface but also through the pores or bubbles present in the introduced material. Thus one gets a double gas introduction. This is confirmed by experiments with sand-blasted die-cast scrap, which resulted in higher density in metal foam bodies.

We claim:

1. Process for producing a light metal foam body, comprising the steps of:
   producing a gas-containing metal melt from light metal pressure die cast scrap that has been melted under atmospheric pressure so as to thereby introduce gas into the fluid light metal without blowing gases into the melt or using blowing agents;
   then bringing the gas-containing metal melt into a mold;
   allowing the gas-containing metal melt to solidify so as to form a metal foam body in a state in which it is at least temporarily under a reduced surrounding pressure,
   in which at least parts of the light metal are converted into at least one compound before melting, which emits a gas soluble in the fluid metal in the region of and/or over the melting interval of the same.

2. Process as per claim 1,
   in which
   the conversion of parts of the light metal takes place through contact with the gas or gas mixture.

3. Process as per claim 1,
   in which
   the conversion of parts of the light metal takes place through contact with aerosol.

4. Process as per claim 1,
   in which
   the compound emits gas(es) at a temperature of max. 250° C., preferably max. 150° C., above the melting or coagulating temperature of the metal.

5. Process as per claim 3,
   in which
   the compound emits gas(es) at a temperature of max. 250° C., preferably max. 150° C., above the melting or solidification temperature of the metal.

6. Process as per claim 5,
   in which
   the light metal is magnesium or a magnesium alloy.

7. Process as per claim 6,
   in which
   the solidification of the fluid metal takes place under a surrounding pressure in the range of 0.03 bar to 0.2 bar.

8. Process as per claim 7,
   in which
   the mould is pre-heated before introducing the fluid metal.

9. Process as per claim 8,
   in which
   a heat-insulated mould is used.

10. Use of die-cast scrap as introduced material in a process as per claim 9.

* * * * *